United States Patent

Maurer

[11] Patent Number: 5,941,637
[45] Date of Patent: Aug. 24, 1999

[54] FLOW FORMING MEMBER THAT REDUCES THE DISADVANTAGEOUS EFFECTS OF THERMAL DEGRADATION IN THE BOUNDARY LAYERS

[75] Inventor: Rudolf Maurer, Winterthur, Switzerland

[73] Assignee: Sulzer Chemtech AG, Winterthur, Switzerland

[21] Appl. No.: 08/993,348

[22] Filed: Dec. 18, 1997

[30] Foreign Application Priority Data

Dec. 23, 1996 [EP] European Pat. Off. ............. 96810895

[51] Int. Cl.⁶ .................................................. B01F 5/06
[52] U.S. Cl. ........................................ 366/337; 425/564
[58] Field of Search ................................ 366/78, 87, 91, 366/181.5, 336, 337, 340; 425/200, 564; 138/40, 42; 48/189.4

[56] References Cited

U.S. PATENT DOCUMENTS

| | | | |
|---|---|---|---|
| 2,391,110 | 12/1945 | Walker | 366/340 |
| 3,190,618 | 6/1965 | Katzen | 366/337 |
| 3,417,967 | 12/1968 | Richens et al. | 366/340 |
| 3,743,250 | 7/1973 | Fitzhugh . | |
| 3,827,676 | 8/1974 | Brasie . | |
| 4,072,296 | 2/1978 | Boom . | |
| 4,272,236 | 6/1981 | Rees et al. | 425/564 |
| 4,441,823 | 4/1984 | Power | 366/340 |
| 5,334,008 | 8/1994 | Gellert | 425/564 |

FOREIGN PATENT DOCUMENTS

| | | |
|---|---|---|
| 0361361A2 | 4/1990 | European Pat. Off. . |
| 94 12 749 U | 11/1994 | Germany . |
| 1230655 | 5/1986 | U.S.S.R. . |
| 1650228 | 5/1991 | U.S.S.R. .............. 366/337 |

*Primary Examiner*—Charles E. Cooley
*Attorney, Agent, or Firm*—Townsend and Townsend and Crew LLP

[57] ABSTRACT

The flow forming member for a polymer melt comprises an inlet point as well as an outlet point, a tubular channel connecting these points and a rod-like body arranged along the channel axis. At least one static mixing element is arranged in the channel, preferably at least two static mixing elements are arranged one after the other. The mixing elements have apertures for the accommodation of the rod-like body. A firm connection exists between the body and the mixing elements. A minimum gap is provided between the mixing elements and the channel wall which permits a displacement of the body in the channel or an insertion into the channel.

10 Claims, 1 Drawing Sheet

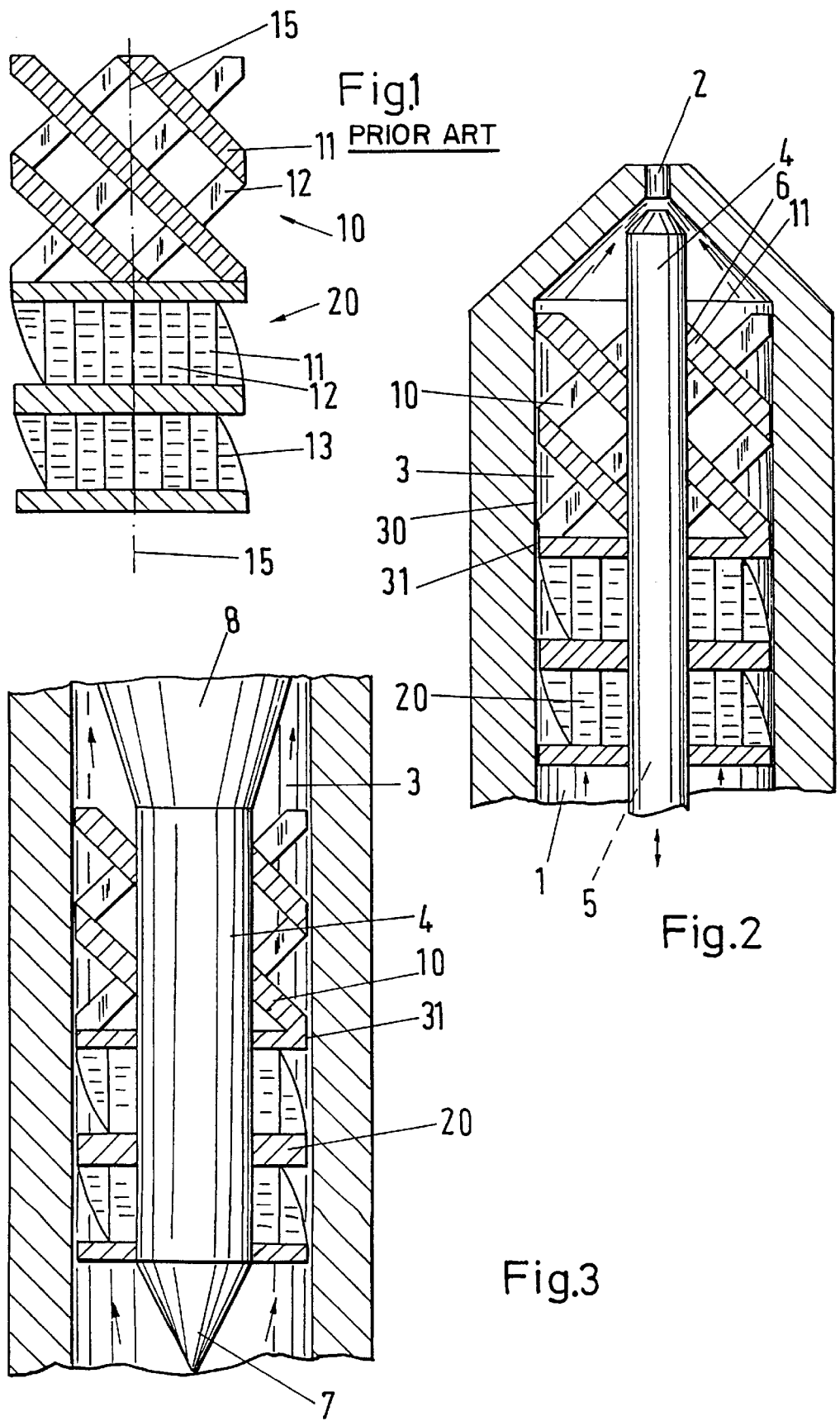

FLOW FORMING MEMBER THAT REDUCES THE DISADVANTAGEOUS EFFECTS OF THERMAL DEGRADATION IN THE BOUNDARY LAYERS

BACKGROUND OF THE INVENTION

1. Field of the Invention

The invention relates to a flow forming member for a polymer melt.

2. Description of the Prior Art

A flow forming member of this kind is, for example, the outlet point of the injection unit of an injection molding machine, which is formed as a nozzle and which serves for the production of plastic parts. The nozzle, namely a closure nozzle, comprises a rod-like body, namely the closure needle, and a tubular channel along the axis of which the needle can be moved. A polymer melt is pressed under high pressure from an entry point through the ring channel between the channel wall and the needle surface to the nozzle opening. The ring channel must be about six to eight times longer than the tube diameter in order that inhomogeneities of the flow profile at the entry point can even themselves out prior to the outlet point. A reduction of the inhomogeneities is required in order to obtain a desired quality of the product.

In many polymers an irreversible change takes place in the molten state, a thermal degradation whose extent depends on the length of time during which the polymer is molten. Such changes lead to traces in the products which are detrimental to their quality. When the polymer flows through the narrow ring channel of the injection molding nozzle, boundary layers form on the channel wall as well as on the needle surface in which the dwell time of the polymer is substantially longer than in the central region of the ring channel. Therefore, an exacerbated degradation arises in the boundary layers which has a particularly disadvantageous effect on the product quality.

Comparable conditions are present in hollow body extrusion plants for the production of, for example, bottles or tubes. Plants of this kind contain a flow forming member in which a tubular channel likewise connects an inlet point to an outlet point, with the channel containing a rod-like body arranged along the channel axis. The rod-like body is the shaft of a mandrel by means of which a string-like melt flow is reformed into a flow with a ring shaped cross-section.

SUMMARY OF THE INVENTION

The object of the invention is to provide means for the named flow forming members which reduce the disadvantageous effects of the thermal degradation in the boundary layers. This object is satisfied by static mixing elements which are suitably formed and arranged at suitable positions.

The flow forming member for a polymer melt comprises an inlet point as well as an outlet point, a tubular channel connecting these points and a rod-like body arranged along the channel axis. At least one static mixing element is arranged in the channel; preferably at least two static mixing elements are arranged one after the other. The mixing elements have apertures for the accommodation of the rod-like body. A firm connection exists between the body and the mixing elements. A minimum gap is provided between the mixing elements and the channel wall which permits a displacement of the body in the channel or an insertion into the channel.

The mixing elements have apertures for the accommodation of the rod-like body. Apertures in themselves lessen the mechanical stability of the mixing elements. However, in contrast, an improvement in the durability of the mixing elements results by reason of the firm connection provided in accordance with the invention between the rod-like body and the mixing elements.

In order that the mixing elements are particularly resistant with respect to the pressure forces, they are advantageously cast, so that they each form a continuous component without joint positions, i.e. a component with a monolithic structure.

The mixing element advantageously comprises a plurality of bridges arranged in layers, with the bridges of adjacent layers crossing one another. The bridges subtend an angle with respect to the channel axis of, for example, 45°, which can also have a different value between 10° and 70°.

In known hollow body extrusion plants, the mandrel of the flow forming member is centered within the channel by mandrel holding ridges. Such ridges can be dispensed within the member in accordance with the invention since the centering results from the static mixers.

Centering is also required for the nozzle closure needles. This must be very precise in order that a tight closure of the nozzle opening is possible. In known injection nozzles the needle must be designed relatively thick so that it is not deformed by the forces acting on it and thus that the needle always remains exactly centrally oriented. In the nozzle in accordance with the invention the mixing elements also represent a mechanical stabilization and, at the same time, a centering means for the needle. Therefore, the needle can be made substantially thinner than in the known nozzles. The closure needle can have a diameter in the region of the mixing elements which is less than a third of the channel diameter.

The length of the mixing paths can be substantially shorter in the member in accordance with the invention than in the known members, namely less than about three times the channel diameter. The amount of melt which is present in the ring channel is thus correspondingly smaller. Since the dwell time is thereby shorter, the extent of the thermal degradation is also less.

BRIEF DESCRIPTION OF THE DRAWINGS

FIG. 1 is a central longitudinal section through two known static mixing elements which are arranged one after the other, FIG. 2 is a longitudinal section through a part of an injection molding nozzle in accordance with the invention, and FIG. 3 is a corresponding longitudinal section through a flow forming member for a bottle blowing or tube extrusion plant.

DETAILED DESCRIPTION OF THE PREFERRED EXEMPLARY EMBODIMENTS

The mixing elements 10 and 20 illustrated in FIG. 1 have a structure which is known, for example, from CH-PS 642 564. The two mixing elements are arranged one after the other in the direction of a longitudinal axis 15. The structure of a mixing element is compounded of bridges 11, 12, 13 which mutually engage and cross one another. The bridges form two groups of structure elements 11 and 12 respectively which are oriented in parallel.

The mixing elements 10 and 20 are two monolithic components. The one is arranged to be rotated with respect to the other about the axis 15 by 90°. The two elements together can also form a single monolithic component. The mixing elements shown are provided for a tube with a circular cross-section. Therefore, the bridges 13 at the edges are rounded off in correspondence with the tube wall.

The injection molding nozzle shown in FIG. 2 contains the mixing elements 10, 20 of FIG. 1, which now additionally have apertures 5 for accommodating the rod-like body 4, i.e. the closure needle. There are firm connections 6 between the bridges 11, 12 of the mixing elements and the surface of the needle 4. Between the wall 30 of the channel 3 and the mixing elements 10, 20 there is a narrow gap 31 which, on the one hand, centers the needle 4 and, on the other hand, allows sufficient clearance for the needle 4 to be movable along the channel 3. The width of the gap 31 is about 0.1 to 0.3 mm. The nozzle opening or outlet point 2 can be closed tight with the needle 4.

In the illustration of the injection needle, a drive for the closure needle 4, which can be moved back and forth, and a supply point for the polymer melt, which is, for example arranged laterally, at the drive-side end of the channel 3, are lacking. The supply point can be regarded as the inlet point of the flow forming member; in FIG. 2, however the open cross-sectional surface at the lower end of the drawn part is specified as the inlet point 1.

The flow forming member shown in FIG. 3, which is associated with a hollow body extrusion plant, has substantially the same construction as the injection molding nozzle of FIG. 2. Here the rod-like body 4 is the shaft of a mandrel, which also comprises an acute cone 7 at the entrance point 1 and an obtuse cone 8 at the ring-shaped outlet point 2. (A non-illustrated supply for a gas infeed can be provided at the tip of the acute cone 7.) In contrast to the injection molding nozzle, the body 4 is a stationary component here. A minimum gap 31 permits a rapid removal and insertion of the mandrel, for example for cleaning purposes.

What is claimed is:

1. A flow forming member for a polymer melt, the member comprising:

an inlet point;

an outlet point;

a tubular channel coupling the inlet point and the outlet point, the tubular channel defining an axis;

a rod-like body arranged along the axis defined by the channel;

at least one static mixing element arranged in the channel, the at least one mixing element including apertures for accommodation of the rod-like body;

wherein a firm connection exists between the rod-like body and the at least one mixing element;

wherein a minimum gap is defined between the at least one mixing element and a wall of the channel that permits a displacement of the body in the channel or an insertion into the channel; and wherein the mixing element includes structure that comprises a plurality of bridges arranged in at least three adjacent layers, the bridges of said adjacent layers crossing one another and the bridges subtending an angle with respect to the axis defined by the channel, the angle having a value between 10° and 70°.

2. A flow forming member in accordance with claim 1 wherein the at least one mixing element is executed to be monolithic.

3. A flow forming member in accordance with claim 1 wherein the outlet point is a closure nozzle, wherein the rod-like body is a closure needle that is movable along the channel together with the at least one mixing element, and wherein the member is used as an injection molding nozzle.

4. A flow forming member in accordance with claim 3 wherein the closure needle has a diameter less than one-third a diameter of the channel in a region of the at least one mixing element.

5. A flow forming member in accordance with claim 1 wherein the outlet point is executed in the shape of a ring, wherein the rod-like body is a shaft of a mandrel by means of which a string-like melt flow may be re-formed into a flow with a ring shaped cross-section, and wherein the flow forming member is used in a hollow body extrusion plant.

6. A flow forming member in accordance with claim 1 wherein the at least one mixing element is a cast body.

7. A flow forming member in accordance with claim 1 wherein the connection between the mixing element and the rod-like body is produced by brazing.

8. A flow forming member in accordance with claim 1 wherein the gap defined between the mixing element and the channel wall has a width of about 0.1 to 0.3 mm.

9. A flow forming member in accordance with claim 1 wherein a length of a mixing path is less than three times a diameter of the channel.

10. A flow forming member in accordance with claim 1 wherein the member comprises two static mixing elements arranged one after the other.

* * * * *